United States Patent [19]
Harling

[11] Patent Number: 5,380,033

[45] Date of Patent: Jan. 10, 1995

[54] FOLDING UTILITY CART APPARATUS

[76] Inventor: Richard L. Harling, 746 Kippy Dr., Colton, Calif. 92324

[21] Appl. No.: 183,860

[22] Filed: Jan. 21, 1994

[51] Int. Cl.⁶ .......................... B62B 1/12; B62B 1/14; B62B 1/16
[52] U.S. Cl. ............................. 280/654; 280/47.19; 280/47.26; 280/47.28
[58] Field of Search ............... 280/652, 659, 47.19, 280/47.26, 47.27, 47.28, 47.33, 63, 654

[56] References Cited

U.S. PATENT DOCUMENTS

| | | | |
|---|---|---|---|
| D. 184,571 | 3/1959 | Larson | 280/47.19 X |
| D. 303,443 | 9/1989 | Shoctor . | |
| 1,718,962 | 7/1929 | Kimball | 280/47.26 X |
| 1,751,902 | 3/1930 | Brown | 280/47.26 |
| 2,755,096 | 7/1956 | Fishalow | 280/652 |
| 3,479,047 | 11/1969 | Bailey | 280/47.19 |
| 3,893,699 | 7/1975 | Morris | 280/659 |
| 4,160,557 | 7/1979 | Taylor | 280/652 |
| 4,179,132 | 12/1979 | Rich | 280/47.26 |
| 4,199,161 | 4/1980 | Nieminen et al. . | |
| 4,448,434 | 5/1984 | Anderson | 280/47.28 X |
| 4,821,903 | 4/1989 | Hayes . | |
| 4,826,187 | 5/1989 | Abbott et al. | 280/652 X |
| 4,917,393 | 4/1990 | Rogers | 280/47.28 |
| 5,040,808 | 8/1991 | McIntyre . | |
| 5,110,147 | 5/1992 | Gershman . | |

FOREIGN PATENT DOCUMENTS 813084 5/1937 France ................ 280/47.27

Primary Examiner—Brian L. Johnson

[57] ABSTRACT

A new and improved folding utility cart apparatus includes a vertical support assembly which includes a top portion adapted to serve as a handle, a middle portion, and a bottom portion. A pair of wheels are connected to the bottom portion of the vertical support assembly. A container support assembly is rotatably connected to the bottom portion of the vertical support assembly. A limit assembly is connected between the vertical support assembly and the container support assembly, for limiting rotation of the container support assembly around the bottom portion of the vertical support assembly. A container top guide assembly is rotatably supported by the middle portion of the vertical support assembly. The container top guide assembly includes a first lever arm portion, a fulcrum portion, a second lever arm portion, and a guide ring. A spring assembly is connected between the top portion of the vertical support assembly and the first lever arm portion of the container top guide assembly. The spring assembly is capable of exerting a clamping force between the guide ring assembly of the container top guide assembly and a top of a container. A locking assembly is selectively connected between the middle portion of the vertical support assembly and the first lever arm portion of the container top guide assembly. When not is use, the apparatus can be folded by folding the container support assembly up toward the vertical support assembly and by folding the guide ring assembly down toward the folded up container support assembly.

14 Claims, 3 Drawing Sheets

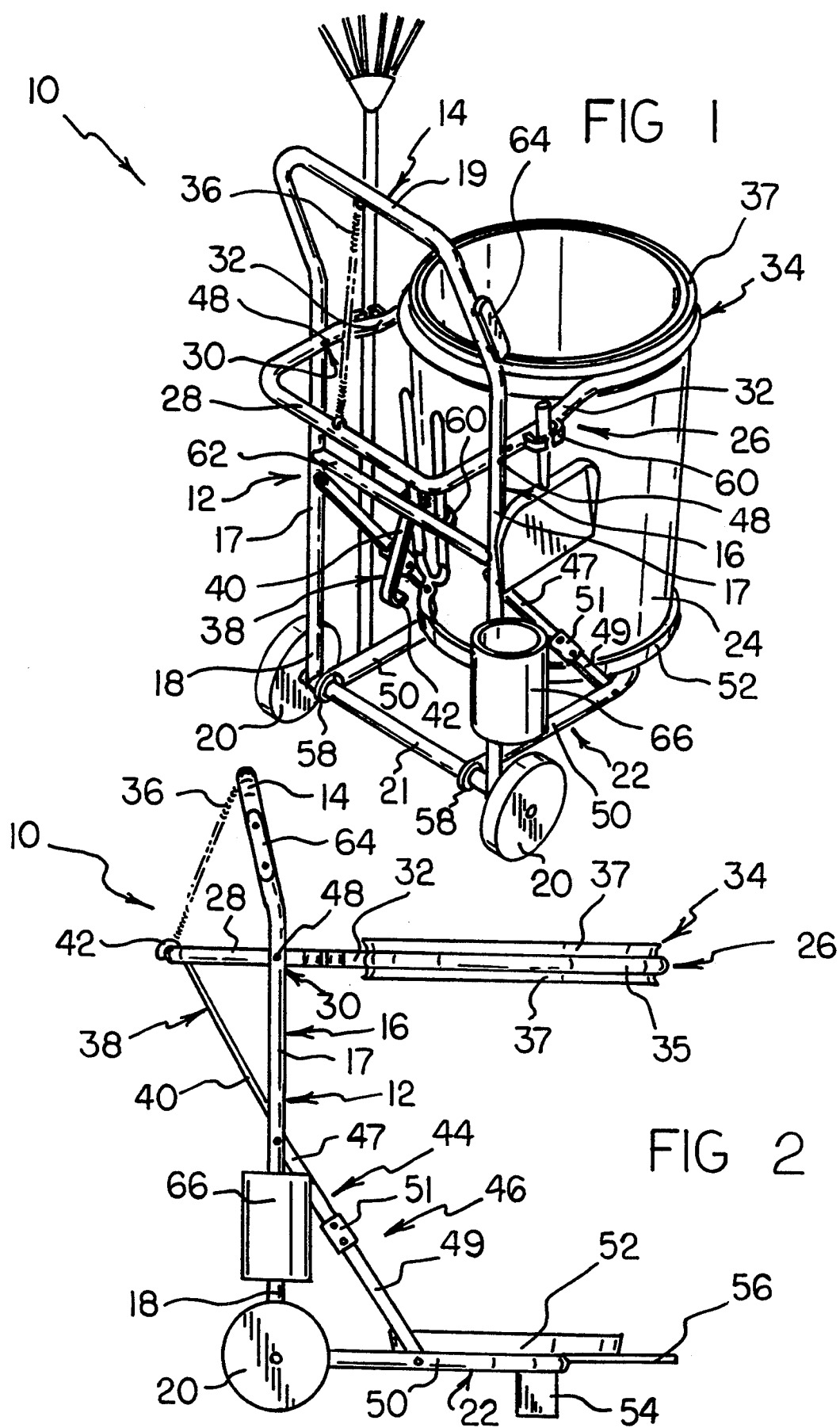

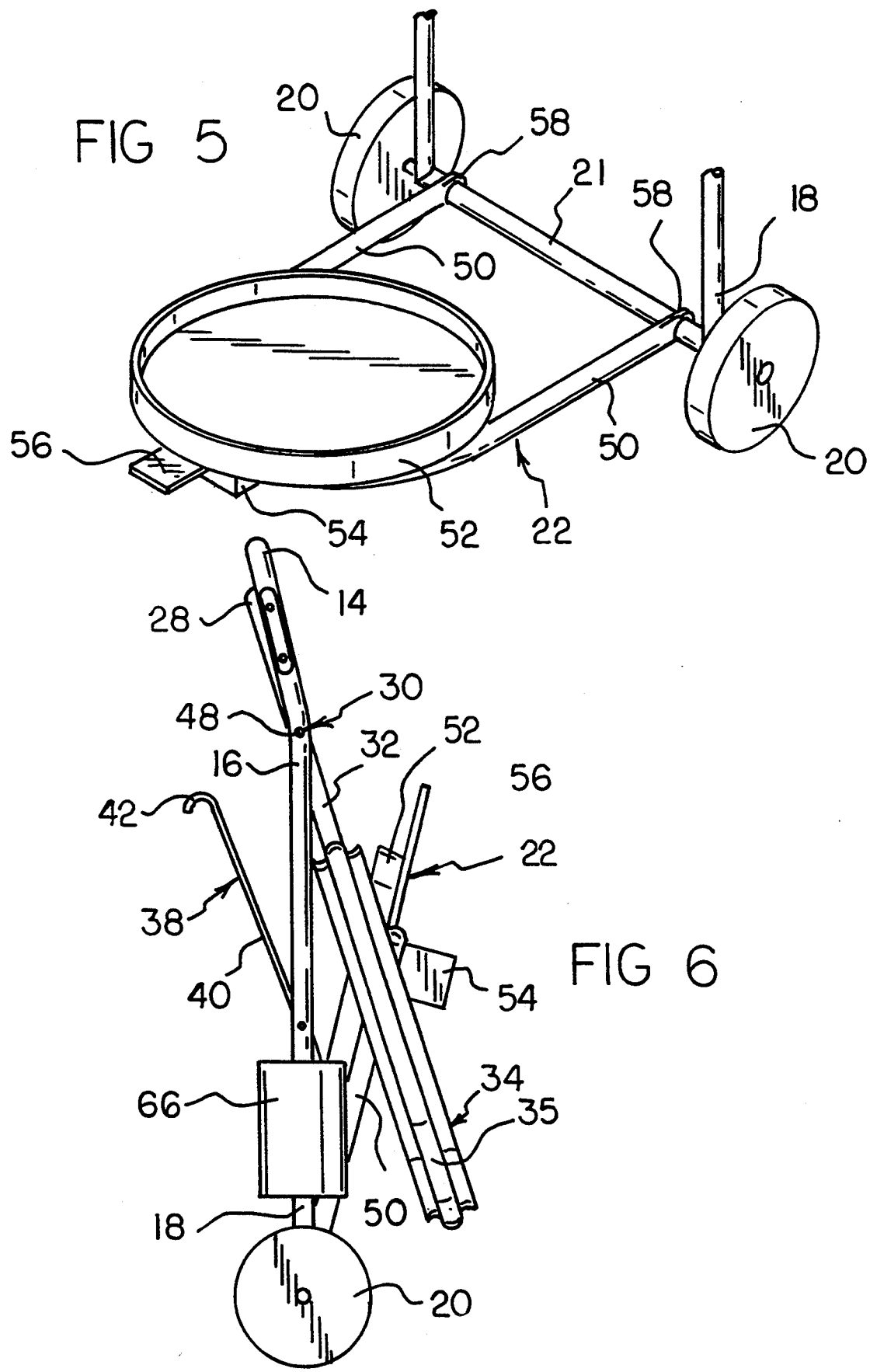

FOLDING UTILITY CART APPARATUS

BACKGROUND OF THE INVENTION

1. Field of the Invention

The present invention relates generally to utility carts and, more particularly, to a utility cart especially adapted for carrying a can and for folding for compact storage.

2. Description of the Prior Art

Wheeled carts are well known and are used for a number of purposes. Of special utility for yard work are carts that are capable of carrying a relatively large can, e.g. 32–40 gallon capacity. When grass is cut, the cuttings are often collected and bagged rather than leaving the cuttings on the grass. Collection of the cuttings often involves unloading a grass catcher on a lawnmower into a can or bag. Flaccid bags are often used for collecting curings, and the cuttings can be disposed of in the flaccid bags. The process of filling a flaccid bag with grass cuttings from a grass catcher may be a difficult task because it may be difficult for a single individual to handle both the flaccid bag and the lawnmower grass catcher at the same time. To efficiently handle the flaccid bag may require two hands. To efficiently handle the lawnmower grass catcher may also require two hands. Therefore, to handle both the flaccid bag and the lawnmower grass catcher efficiently at the same time, four hands would be required.

To avoid the need for using two hands to efficiently handle a flaccid bag when filled from a lawnmower grass catcher, it would be desirable if a cart were provided that holds a flaccid bag open to receive grass cuttings in a hands-free manner.

Aside from cutting grass, additional tasks are often undertaken in yard work. To assist in carrying out these additional tasks, it would be desirable if a utility cart for yard work were provided which carried a number of different types of tools or implements used in yard work.

Devices that are used outdoors only occasionally are often stored indoors. Such is the case for a utility cart used in assisting in the collection of grass cuttings. A utility cart for yard work may be relatively large when in use. To decrease the size of the utility cart when stored indoors, it would be desirable if the utility cart folded for storage.

Once a can or a bag retained the a utility cart is full, the can or bag is removed from the cart. In lifting a full can or a full bag, the can or bag often catches on the cart. In so doing, lifting of the can or bag may also entail lifting of the cart, without effectively separating the can or bag from the cart. In this respect, it would be desirable if a utility cart for yard work were provided which had a device for facilitating separation of a can or bag from the cart.

Wheeled carts that have four wheels may be difficult to stop rolling on hilly surfaces. A brake mechanism may be necessary. Because of the expense and complexity of a brake mechanism, it would be desirable if a utility cart for yard work was prevented from rolling on hilly surfaces without the need for a brake mechanism.

When a can is carried by a utility cart for yard work, the surface of the yard is most often uneven or rough. As a result, there is a tendency for the can to be bounced off of the cart. In this respect, it would be desirable if a utility cart for yard work were provided which included a device for retaining the can on the cart even when the cart encounters rough terrain.

Cans for receiving grass cuttings, leaves, etc. come in a variety of heights. In this respect, it would be desirable if a utility cart for yard work were provided which can easily accommodate different cans having different heights.

Throughout the years, a number of innovations have been developed relating to utility carts for cans, and the following U.S. patents are representative of some of those innovations: U.S. Pat. Nos. 4,199,161; 4,821,903; 5,040,808; 5,110,147; and U.S. Pat. Des. No. 303,443. More specifically, U.S. Pat. No. 4,199,161 discloses a trash cart that has a can integrated into the structure of the cart, and the cart does not fold for storage. U.S. Pat. No. 4,821,903 discloses the combination of a trash bin and wheeled cart. A common lid is provided for a plurality of bins for receiving different recyclable materials. The cart does not fold for storage. U.S. Pat. No. 5,040,808 discloses a rigid, nonfolding two-wheeled cart used for transporting a plurality of cans. U.S. Pat. No. 5,110,147 discloses nonfoldable wheeled trash can transporters that receive the bottoms of trash cans. Once the cans are secured to the transporters, the cans themselves are grasped to roll the cans along. U.S. Pat. Des. No. 303,443 discloses a nonfoldable rigid trash can cart that has three wheels. A flexible chain is used to retain the can on the cart.

Thus, while the foregoing body of prior art indicates it to be well known to use wheeled utility carts, the prior art described above does not teach or suggest a folding utility cart apparatus which has the following combination of desirable features: (1) holds a flaccid bag open to receive grass cuttings in a hands-free manner; (2) carries a number of different types of tools or implements used in yard work; (3) folds for storage; (4) has a device for facilitating separation of a can or bag from the cart; (5) is prevented from rolling on hilly surfaces without the need for a brake mechanism; (6) includes a device for retaining the can on the cart even when the cart encounters rough terrain; and (7) can easily accommodate different cans having different heights. The foregoing desired characteristics are provided by the unique folding utility cart apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved folding utility cart apparatus which includes a vertical support assembly which includes a top portion adapted to serve as a handle, a middle portion below the top portion, and a bottom portion below the middle portion. A pair of wheels is connected to the bottom portion of the vertical support assembly. A container support assembly is rotatably connected to the bottom portion of the vertical support assembly. The container support assembly is adapted to support a container by a bottom of the container.

A limit assembly is connected between the vertical support assembly and the container support assembly, for limiting rotation of the container support assembly around the bottom portion of the vertical support assembly. A container top guide assembly is rotatably supported by the middle portion of the vertical support assembly.

The container top guide assembly includes a first lever arm portion. A fulcrum portion is connected to the first lever arm portion and is rotatably connected to the middle portion of the vertical support assembly. A second lever arm portion is connected to the first lever arm portion, and a guide ring assembly is connected to the second lever arm portion. A pulling-tension-exerting assembly is connected between the top portion of the vertical support assembly and the first lever arm portion of the container top guide assembly. The pulling-tension-exerting assembly is capable of exerting a clamping force between the guide ring assembly of the container top guide assembly and a top of a container.

A locking assembly includes a first end which is connected to the middle portion of the vertical support assembly below the connection of the fulcrum portion of the container top guide assembly to the middle portion of the vertical support assembly. The locking assembly also includes a second end adapted to be selectively connected to the first lever arm portion of the container top guide assembly. The middle portion of the vertical support assembly includes two spaced apart vertical struts, the top portion of the vertical support assembly includes a top transverse strut is connected between the two struts, and the bottom portion of the vertical support assembly includes a bottom transverse strut.

The container support assembly is rotatably connected to the bottom transverse strut, and the limit assembly includes a pair of collapsible angle assemblies connected between the respective struts and the container support assembly. Each of the collapsible angle assemblies includes a first angle member connected to the struts of the vertical support assembly. A second angle member is connected to the support bars of the container support assembly, and a removable link assembly is adapted to connect the first angle member to the second angle member, such that the first angle member, the second angle member, and the link assembly form a rigid angle assembly between the vertical support assembly and the container support assembly.

The container top guide assembly includes a U-shaped first lever arm portion connected between the vertical struts of the vertical support assembly. A pair of second lever arm portions is connected to respective ends of the U-shaped first lever arm portion, and a guide ring assembly is connected to the pair of second lever arm portions. The fulcrum portions connecting the ends of the U-shaped shaped first lever arm portion to the respective struts include hinge pins. The pulling-tension-exerting assembly includes a spring assembly.

The second end of the locking assembly includes a hook end adapted to be selectively connected to the U-shaped first lever arm portion of the container top guide assembly.

The guide ring assembly includes a ring member connected to the second lever arm portion, and a cylindrical flange member is connected to the ring member and projects above and/or below the ring member.

The container support assembly includes a pair of support bars rotatably connected to the bottom transverse strut of the vertical support assembly. A can support base is supported by the a respective top sides of the support bars. A leg assembly is connected to a bottom side of the support bars, and a foot-receiving assembly is adapted for receiving a foot of a user for weighing down the container support assembly when a container is lifted off of the container support assembly and lifted out of the container top guide assembly.

The bottom transverse strut of the vertical support assembly is a cylindrical tube, and the support bars are rotatably connected to the bottom transverse strut by circular rings that encompass the bottom transverse strut. The second lever arm portion of the container top guide assembly includes a bracket for holding an implement. In addition, the middle portion of the vertical support assembly includes a bracket for holding an implement.

The top portion of the vertical support assembly includes a flexible-line support assembly. The middle portion of the vertical support assembly includes an auxiliary storage container attached thereto.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved folding utility cart apparatus which has all of the advantages of the prior art and none of the disadvantages.

It is another object of the present invention to provide a new and improved folding utility cart apparatus which may be easily and efficiently manufactured and marketed.

It is a further object of the present invention to provide a new and improved folding utility cart apparatus which is of durable and reliable construction.

An even further object of the present invention is to provide a new and improved folding utility cart apparatus which is susceptible of a low cost of manufacture with regard to both materials and labor, and which accordingly is then susceptible of low prices of sale to the consuming public, thereby making such folding utility cart apparatus available to the buying public.

Still yet a further object of the present invention is to provide a new and improved folding utility cart apparatus which holds a flaccid bag open to receive grass cuttings in a hands-free manner.

Still another object of the present invention is to provide a new and improved folding utility cart apparatus that carries a number of different types of tools or implements used in yard work.

Yet another object of the present invention is to provide a new and improved folding utility cart apparatus which readily folds for storage.

Even another object of the present invention is to provide a new and improved folding utility cart apparatus that has a device for facilitating separation of a can or bag from the cart.

Still a further object of the present invention is to provide a new and improved folding utility cart apparatus which is prevented from rolling on hilly surfaces without the need for a brake mechanism.

Yet another object of the present invention is to provide a new and improved folding utility cart apparatus that includes a device for retaining the can on the cart even when the cart encounters rough terrain.

Still another object of the present invention is to provide a new and improved folding utility cart apparatus which can easily accommodate different cans having different heights.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a rear perspective view showing a preferred embodiment of the folding utility cart apparatus of the invention with a can being carried and with a variety of yard implements also being carried.

FIG. 2 is an enlarged side view of the embodiment of the folding utility cart apparatus shown in FIG. 1 with the can and yard implements removed and with a lock lever in a locking position.

FIG. 5 is an enlarged partial perspective view of a bottom portion of the embodiment of the invention shown in FIG. 2.

FIG. 6 is a side view of the embodiment of the invention shown in FIG. 2 in a folded condition.

DESCRIPTION OF THE PREFERRED EMBODIMENT

Figure 3:
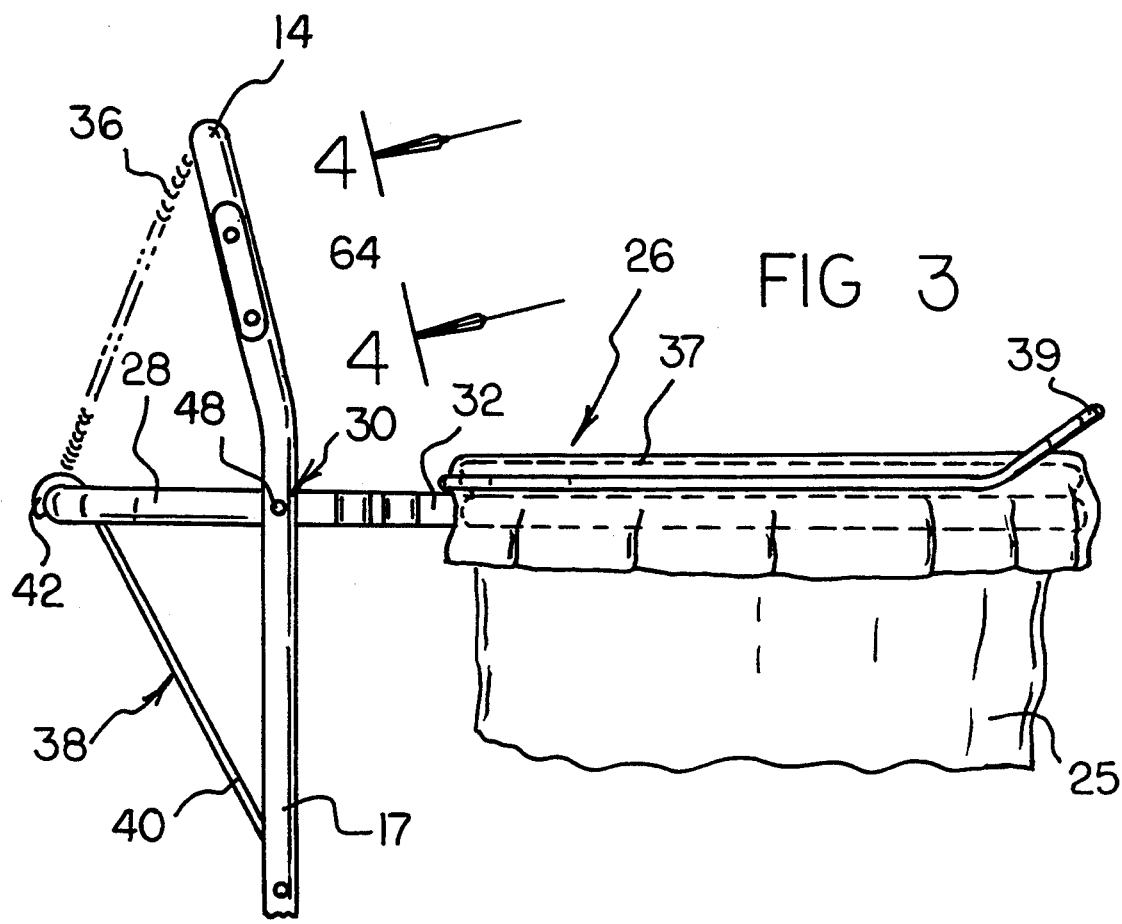
FIG. 3 is an enlarged partial side view of the embodiment of the folding utility cart apparatus of FIG. 2 with a flaccid bag carried by the invention.
Figure 4:
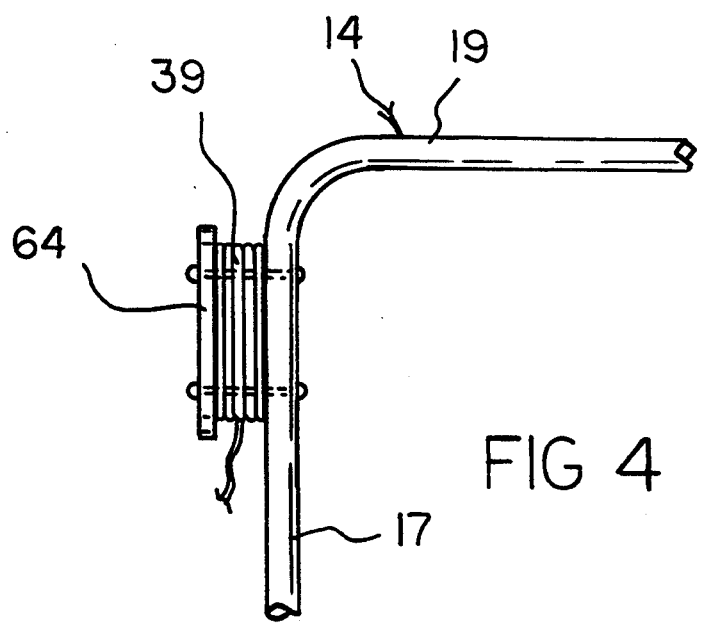
FIG. 4 is a partial frontal view of the embodiment of the apparatus shown in FIG. 3 taken along line 4—4 of FIG. 3.

With reference to the drawings, a new and improved folding utility cart apparatus embodying the principles and concepts of the present invention will be described.

Turning initially to FIGS. 1-5, there is shown an exemplary embodiment of the folding utility cart apparatus of the invention generally designated by reference numeral 10. In its preferred form, folding utility cart apparatus 10 includes a vertical support assembly 12 which includes a top portion 14 adapted to serve as a handle, a middle portion 16 below the top portion 14, and a bottom portion 18 below the middle portion 16. A pair of wheels 20 is connected to the bottom portion 18 of the vertical support assembly 12. A container support assembly 22 is rotatably connected to the bottom portion 18 of the vertical support assembly 12. The container support assembly 22 is adapted to support a container 24 by a bottom of the container 24.

A limit assembly 44 is connected between the vertical support assembly 12 and the container support assembly 22, for limiting rotation of the container support assembly 22 around the bottom portion 18 of the vertical support assembly 12. A container top guide assembly 26 is rotatably supported by the middle portion 16 of the vertical support assembly 12.

The container top guide assembly 26 includes a first lever arm portion 28. A fulcrum portion 30 is connected to the first lever arm portion 28 and is rotatably connected to the middle portion 16 of the vertical support assembly 12. A second lever arm portion 32 is connected to the first lever arm portion 28, and a guide ring assembly 34 is connected to the second lever arm portion 32. A pulling-tension-exerting assembly 36 is connected between the top portion 14 of the vertical support assembly 12 and the first lever arm portion 28 of the container top guide assembly 26. The pulling-tension-exerting assembly 36 is capable of exerting a clamping force between the guide ring assembly 34 of the container top guide assembly 26 and a top of a container 24.

A locking assembly 38 includes a first end 40 which is connected to the middle portion 16 of the vertical support assembly 12 below the connection of the fulcrum portion 30 of the container top guide assembly 26 to the middle portion 16 of the vertical support assembly 12. The locking assembly 38 also includes a second end 42 adapted to be selectively connected to the first lever arm portion 28 of the container top guide assembly 26. The middle portion 16 of the vertical support assembly 12 includes two spaced apart vertical struts 17, the top portion 14 of the vertical support assembly 12 includes a top transverse strut 19 is connected between the two struts 17, and the bottom portion 18 of the vertical support assembly 12 includes a bottom transverse strut 21. The locking assembly 38 is connected to a transverse strut 62 connected between the struts 17 of the vertical support assembly 12.

The container support assembly 22 is rotatably connected to the bottom transverse strut 21, and the limit assembly 44 includes a pair of collapsible angle assemblies 46 connected between the respective struts 17 and the container support assembly 22. Each of the collapsible angle assemblies 46 includes a first angle member 47 connected to the struts 17 of the vertical support assembly 12. A second angle member 49 is connected to the support bars 50 of the container support assembly 22, and a removable link assembly 51 is adapted to connect the first angle member 47 to the second angle member 49, such that the first angle member 47, the second angle member 49, and the link assembly 51 form a rigid angle assembly between the vertical support assembly 12 and the container support assembly 22. The distal end of the first angle member 47 contains an aperture. The distal end of the second angle member 49 contains an aperture. The removable link assembly 51 contains two apertures. One of the apertures of the removable link assembly 51 is placed in registration with the aperture at the distal end of the first angle member 47. The other of the apertures of the removable link assembly 51 is placed in registration with the aperture at the distal end of the second angle member 49. Then bolts are placed through the registered apertures, and nuts are connected to the bolts. In this way, a rigid angle assembly is formed when the folding utility cart apparatus of the invention is used in the yard. For storage, however, the nuts and bolts are disconnected from the removable link assembly 51, and the removable link assembly 51 is removed leaving the first angle member 47 and the second angle member 49 disconnected from each other. With the first angle member 47 and the second angle member 49 disconnected from each other, the container support assembly 22 can be rotated toward the vertical support assembly 12 when the folding utility cart apparatus of the invention is folded and stored.

An alternative embodiment of the limit assembly 44 for limiting rotation between the container support assembly 22 and the vertical support assembly 12 when the folding utility cart apparatus of the invention is in use may take the form of a flexible, non-stretchable wire connected between the container support assembly 22 and the vertical support assembly 12. When the apparatus of the invention is folded, the flexible, non-stretchable wire easily folds permitting the container support assembly 22 to be rotated toward the vertical support assembly 12.

The container top guide assembly 26 includes a U-shaped first lever arm portion 28 connected between the vertical struts 17 of the vertical support assembly 12. A pair of second lever arm portions 32 is connected to respective ends of the U-shaped first lever arm portion 28, and a guide ring assembly 34 is connected to the pair of second lever arm portions 32. A respective fulcrum portion 30 is connected between each end of the U-shaped first lever arm portion 28 and the pair of struts 17. The fulcrum portions 30 connecting the ends of the U-shaped first lever arm portion 28 to the respective struts 17 include hinge pins 48. The pulling-tension-exerting assembly 36 includes a spring assembly 36.

In use, when a container 24, such as a trash can, is used with the invention, the spring 36 pulls the first lever arm portion 28 of the container top guide assembly 26 toward the top portion 14 of the vertical support assembly 12. Through the fulcrums 30, the pulling force of the pulling-tension-exerting assembly 36 is reversed and converted into a clamping force between the guide ring assembly 34 of the container top guide assembly 26 and the container support assembly 22. This clamping force serves to keep the container 24 in position on the container support assembly 22 over bumpy terrain. When a container 24 is clamped between the guide ring assembly 34 of the container top guide assembly 26 and the container support assembly 22, the locking assembly 38 is not in use. That is, the second end 42 of the locking assembly 38 is not connected to the first lever arm portion 28 of the container top guide assembly 26. The second end 42 of the locking assembly 38 includes a hook end 42 adapted to be selectively connected to the U-shaped first lever arm portion 28 of the container top guide assembly 26.

The guide ring assembly 34 includes a ring member 35 connected to the second lever arm portion 32, and a cylindrical flange member 37 is connected to the ring member 35 and projects above and/or below the ring member 35. When a flaccid bag 25, as shown in FIG. 3, is used for retaining grass cuttings and the like, the top edge of the flaccid bag 25 is draped over the cylindrical flange member 37, and a flexible line 39 is placed around the draped edge of the flaccid bag 25 around the cylindrical flange member 37 to sandwich the draped edge of the flaccid bag 25 between the flexible line 39 and the cylindrical flange member 37. The flaccid bag 25 is thus maintained in an open position. The flexible line 39 can be a flexible, stretchable cord or flexible, stretchable spring.

The container support assembly 22 includes a pair of support bars 50 rotatably connected to the bottom transverse strut 21 of the vertical support assembly 12. A can support base 52 is supported by the a respective top sides of the support bars 50. A leg assembly 54 is connected to a bottom side of the support bars 50, and a foot-receiving assembly 56 is adapted for receiving a foot of a user for weighing down the container support assembly 22 when a container 24 is lifted off of the container support assembly 22 and lifted out of the container top guide assembly 26.

The bottom transverse strut 21 of the vertical support assembly 12 is a cylindrical tube, and the support bars 50 are rotatably connected to the bottom transverse strut 21 by circular rings 58 that encompass the bottom transverse strut 21. The second lever arm portion 32 of the container top guide assembly 26 includes a bracket 60 for holding an implement. In addition, the middle portion 16 of the vertical support assembly 12 includes a bracket 60 for holding an implement. Implements held by the brackets 60 includes rakes, brooms, hedge trimmers, and dustpans, among others.

The top portion 14 of the vertical support assembly 12 includes a flexible-line support assembly 64. The flexible-line support assembly 64 supports a quantity of continuous flexible line 39 which may be cut to desired sizes, such as for securing a flaccid bag 25 to a cylindrical flange member 37 of a guide ring assembly 34. The middle portion 16 of the vertical support assembly 12 includes an auxiliary storage container 66 attached thereto. A particularly useful function of the auxiliary storage container 66 is holding ties for flaccid bags 25.

As shown in FIG. 6, when the folding utility cart apparatus of the invention is to folded, the second end 42 of the locking assembly 38 is hooked onto the transverse strut 62 of the container top guide assembly 26. The locking assembly 38 prevents the spring assembly 36 from pulling the transverse strut 62 toward the top portion 14 of the vertical support assembly 12. Then, the container support assembly 22 is rotated up toward the vertical support assembly 12 around the circular rings 58 on the bottom transverse strut 21. This folds the container support assembly 22 up against the vertical support assembly 12. Then, the second end 42 of the locking assembly 38 is removed from the transverse strut 62 of the vertical support assembly 12. When the second end 42 of the locking assembly 38 is removed from the transverse strut 62, the spring 36 is able to pull the transverse strut 62 toward the top portion 14 around the hinge pins 48 at the fulcrum portions 30. As a result, the second lever arm portion 32 and the guide ring assembly 34 of the container top guide assembly 26 are pushed down toward the folded container support assembly 22. The tension of the spring 36 causes the guide ring assembly 34 to press against the folded container support assembly 22 to keep it in the folded condition.

The components of the folding utility cart apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved folding utility cart apparatus that is low in cost, relatively simple in design and operation, and which may advantageously be used to hold a flaccid bag open to receive grass cuttings in a hands-free manner. With the invention, a folding utility cart apparatus is provided which carries a number of different types of tools or implements used in yard work. With the invention, a folding utility cart apparatus is provided which readily folds for storage. With the invention, a folding utility cart apparatus is provided which has a device for facilitating separation of a can or bag from the cart. With the invention, a folding utility cart apparatus is provided which is prevented from rolling on hilly surfaces without the need for a brake mechanism. With the invention, a folding utility cart apparatus is provided which includes a device for retaining the can on the cart even when the cart encounters rough terrain. With the invention, a folding utility cart apparatus is provided which can easily accommodate different cans having different heights.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved folding utility cart apparatus, comprising:
   a vertical support assembly which includes a top portion adapted to serve as a handle, a middle portion below said top portion, and a bottom portion below said middle portion,
   a pair of wheels connected to said bottom portion of said vertical support assembly,
   a container support assembly rotatably connected to said bottom portion of said vertical support assembly, said container support assembly adapted to support a container by a bottom of the container,
   a limit assembly, connected between said vertical support assembly and said container support assembly, for limiting rotation of said container support assembly around said bottom portion of said vertical support assembly,
   a container top guide assembly rotatably supported by said middle portion of said vertical support assembly, said container top guide assembly including a first lever arm portion, a fulcrum portion connected to said first lever arm portion and rotatably connected to said middle portion of said vertical support assembly, a second lever arm portion connected to said first lever arm portion, and a guide ring assembly connected to said second lever arm portion,
   a pulling-tension-exerting assembly connected between said top portion of said vertical support assembly and said first lever arm portion of said container top guide assembly, said pulling-tension-exerting assembly capable of exerting a clamping force between said guide ring assembly of said container top guide assembly and a top of a container, and
   a locking assembly which includes a first end connected to said middle portion of said vertical support assembly below said connection of said fulcrum portion of said container top guide assembly to said middle portion of said vertical support assembly, said locking assembly including a second end adapted to be selectively connected to said first lever arm portion of said container top guide assembly.

2. The apparatus described in claim 1 wherein:
   said middle portion of said vertical support assembly includes two spaced apart vertical struts,
   said top portion of said vertical support assembly includes a top transverse strut connected between said two vertical struts, and
   said bottom portion of said vertical support assembly includes a bottom transverse strut,
   said container support assembly is rotatably connected to said bottom transverse strut, and
   said limit assembly includes a pair of collapsible angle assemblies connected between said respective vertical struts and said container support assembly.

3. The apparatus described in claim 2 wherein each of said collapsible angle assemblies includes:
   a first angle member connected to said vertical struts of said vertical support assembly,
   a second angle member connected to said container support assembly, and
   a removable link assembly adapted to connect said first angle member to said second angle member, such that said first angle member, said second angle member, and said link assembly form a rigid angle assembly between said vertical support assembly and said container support assembly.

4. The apparatus described in claim 1 wherein said container top guide assembly includes:
   a U-shaped first lever arm portion connected between said vertical struts of said vertical support assembly, a pair of second lever arm portions connected to respective ends of said U-shaped first lever arm portion, and a guide ring assembly connected to said pair of second lever arm portions.

5. The apparatus described in claim 4 wherein a pair of said fulcrum portions connect said ends of said U-shaped first lever arm portion to said respective vertical struts and include hinge pins.

6. The apparatus described in claim 4 wherein said pulling-tension-exerting assembly includes a spring assembly.

7. The apparatus described in claim 4 wherein said second end of said locking assembly includes a hook end adapted to be selectively connected to said U-shaped first lever arm portion of said container top guide assembly.

8. The apparatus described in claim 1 wherein said guide ring assembly includes:

a ring member connected to said second lever arm portion, and a cylindrical flange member connected to said ring member and projecting above and below said ring member.

9. The apparatus described in claim 1 wherein said container support assembly includes:

a pair of support bars rotatably connected to a bottom transverse strut of said vertical support assembly, a can support base supported by respective top sides of said support bars, a leg assembly connected to a bottom side of said support bars, and a foot-receiving assembly adapted for receiving a foot of a user for weighing down said container support assembly when a container is being lifted off of said container support assembly and lifted out of said container top guide assembly.

10. The apparatus described in claim 9 wherein:

said bottom transverse strut of said vertical support assembly is a cylindrical tube, and said support bars are rotatably connected to said bottom transverse strut by circular rings that encompass said bottom transverse strut.

11. The apparatus described in claim 1 wherein said second lever arm portion of said container top guide assembly includes a bracket for holding an implement.

12. The apparatus described in claim 1 wherein said middle portion of said vertical support assembly includes a bracket for holding an implement.

13. The apparatus described in claim 1 wherein said top portion of said vertical support assembly includes a flexible-line support assembly.

14. The apparatus described in claim 1 wherein said middle portion of said vertical support assembly includes an auxiliary storage container attached thereto.

* * * * *